(12) United States Patent
Henry et al.

(10) Patent No.: US 7,424,937 B2
(45) Date of Patent: Sep. 16, 2008

(54) ESTIMATING TORQUE/FORCE EXERTED BY A LOAD AGAINST A MOTOR-DRIVEN ACTUATOR

(75) Inventors: Rassem R. Henry, Shelby Township, MI (US); Atef A. Gayed, Marly la Ville (FR)

(73) Assignee: Delphia Technologies, Inc., Troy, MI (US)

(*) Notice: Subject to any disclaimer, the term of this patent is extended or adjusted under 35 U.S.C. 154(b) by 0 days.

(21) Appl. No.: 11/490,297

(22) Filed: Jul. 20, 2006

(65) Prior Publication Data

US 2007/0085414 A1 Apr. 19, 2007

Related U.S. Application Data

(60) Provisional application No. 60/701,540, filed on Jul. 22, 2005.

(51) Int. Cl.
*G01L 5/28* (2006.01)
*B60T 13/74* (2006.01)

(52) U.S. Cl. ...................................... 188/156; 188/158

(58) Field of Classification Search ......... 188/156–164; 303/20, 115.4, 3, 15; 318/432, 685; 701/22
See application file for complete search history.

(56) References Cited

U.S. PATENT DOCUMENTS

| | | | |
|---|---|---|---|
| 4,567,975 A | 2/1986 | Roll | |
| 4,891,764 A * | 1/1990 | McIntosh | .................... 700/183 |
| 5,090,518 A | 2/1992 | Schenk et al. | |
| 6,178,369 B1 | 1/2001 | Böhm | |
| 6,253,141 B1 | 6/2001 | McCann | |
| 6,345,225 B1 | 2/2002 | Böhm et al. | |
| 6,435,625 B1 | 8/2002 | Schwarz et al. | |
| 6,550,871 B1 * | 4/2003 | Bohm et al. | ................... 303/20 |
| 6,711,488 B2 | 3/2004 | Zierolf | |
| 6,851,765 B1 | 2/2005 | Disser | |
| 6,890,041 B1 | 5/2005 | Ribbens et al. | |
| 6,914,406 B1 * | 7/2005 | Wilkes et al. | ................ 318/685 |
| 2004/0154884 A1 * | 8/2004 | Thomas | ...................... 188/156 |
| 2004/0232762 A1 | 11/2004 | Maron | |
| 2005/0001474 A1 | 1/2005 | Zierolf | |
| 2005/0035653 A1 | 2/2005 | Godlewsky et al. | |
| 2005/0046275 A1 | 3/2005 | Disser | |

(Continued)

FOREIGN PATENT DOCUMENTS

EP 1 482 290 12/2004

OTHER PUBLICATIONS

European Search Report dated Nov. 8, 2006.

(Continued)

*Primary Examiner*—Christopher P Schwartz
(74) *Attorney, Agent, or Firm*—Scott A. McBain (57) ABSTRACT

A first method for estimating a torque/force exerted by a load against an actuator driven by an electric motor against the load includes measuring motor current of the electric motor and measuring a position/angle or speed/angular speed of the actuator and includes calculating the torque/force exerted by the load against the actuator using at least a difference between a calculated motor torque/force and a calculated actuator-experienced torque/force. A second method includes measuring input voltage of the electric motor instead of measuring motor current. A third method includes measuring both motor current and input voltage. In one example, without limitation, the actuator is an automotive electromechanical brake caliper.

16 Claims, 6 Drawing Sheets

U.S. PATENT DOCUMENTS

| | | |
|---|---|---|
| 2005/0161295 A1 | 7/2005 | Nilsson et al. |
| 2005/0168066 A1 | 8/2005 | Svendenius et al. |
| 2005/0212355 A1 | 9/2005 | Godlewsky et al. |
| 2005/0269872 A1* | 12/2005 | Ralea .......................... 303/20 |
| 2005/0283283 A1* | 12/2005 | Hisada et al. ................. 701/22 |
| 2006/0017414 A1* | 1/2006 | Joe et al. .................... 318/432 |
| 2006/0131113 A1* | 6/2006 | Christof et al. ............ 188/72.1 |

OTHER PUBLICATIONS

English Translation of EP 1 482 290 A1.

* cited by examiner

ESTIMATING TORQUE/FORCE EXERTED BY A LOAD AGAINST A MOTOR-DRIVEN ACTUATOR

CROSS REFERENCE TO RELATED APPLICATIONS

The present application claims priority of U.S. Provisional Application No. 60/701,540 filed Jul. 22, 2005.

TECHNICAL FIELD

The present invention relates generally to actuators driven by electric motors, and more particularly to estimating a torque/force exerted by a load against an actuator driven by an electric motor.

BACKGROUND OF THE INVENTION

Known vehicle brake systems include electromechanical or electrohydraulic brake calipers which are moved by an actuator wherein the torque/force exerted against the brake pad of the brake caliper is used to control an electric motor which drives the actuator. Conventional control methods include those which use torque/force sensors to measure the torque/force exerted against the brake pad. However, such torque/force sensors are expensive, have hysteresis, and are too sensitive to ambient temperature variation in thermally fluctuating environments such as those found in automotive electromechanical brake calipers.

SUMMARY OF THE INVENTION

A first method of the invention is for estimating a torque/force exerted by a load against an actuator driven by an electric motor against the load and includes several steps. One step includes measuring motor current of the electric motor. Another step includes calculating a motor torque/force of the electric motor from the measured motor current. Another step includes measuring a position/angle or speed/angular speed of the actuator when the actuator is driven by the electric motor to engage the load. Another step includes calculating an actuator-experienced torque/force due to the electric motor and the load from the measured position/angle or the measured speed/angular speed using a mathematical model of the actuator. Another step includes calculating the torque/force exerted by the load against the actuator using at least a difference between the calculated motor torque/force and the calculated actuator-experienced torque/force.

A second method of the invention is for estimating a torque/force exerted by a load against an actuator driven by an electric motor against the load and includes several steps. One step includes measuring input voltage to the electric motor. Another step includes calculating a motor torque/force of the electric motor using at least the measured input voltage and a mathematical model of the electric motor. Another step includes measuring a position/angle or speed/angular speed of the actuator when the actuator is driven by the electric motor to engage the load. Another step includes calculating an actuator-experienced torque/force due to the electric motor and the load from the measured position/angle or the measured speed/angular speed using a mathematical model of the actuator. Another step includes calculating the torque/force exerted by the load against the actuator using at least a difference between the calculated motor torque/force and the calculated actuator-experienced torque/force.

A third method of the invention is for estimating a torque/force exerted by a load against an actuator driven by an electric motor against the load and includes several steps. One step includes measuring input voltage and motor current of the electric motor. Another step includes measuring a position/angle of the actuator when the actuator is driven by the electric motor to engage the load. Another step includes calculating first and second time derivatives of the position/angle. Another step includes calculating the torque/force exerted by the load against the actuator using at least the measured input voltage and motor current, the measured position/angle, the calculated first and second time derivatives, and mathematical models of the electric motor and the actuator.

Several benefits and advantages are derived from one or more of the methods of the invention. In one example, torque/force sensors are not used, wherein such torque/force sensors are expensive, have hysteresis, and are too sensitive to ambient temperature variation in thermally fluctuating environments such as those found in automotive electromechanical brake calipers. Applicants have performed successful computer simulations of examples of the first, second and third methods.

DESCRIPTION OF THE PREFERRED EMBODIMENTS

Figure 1:
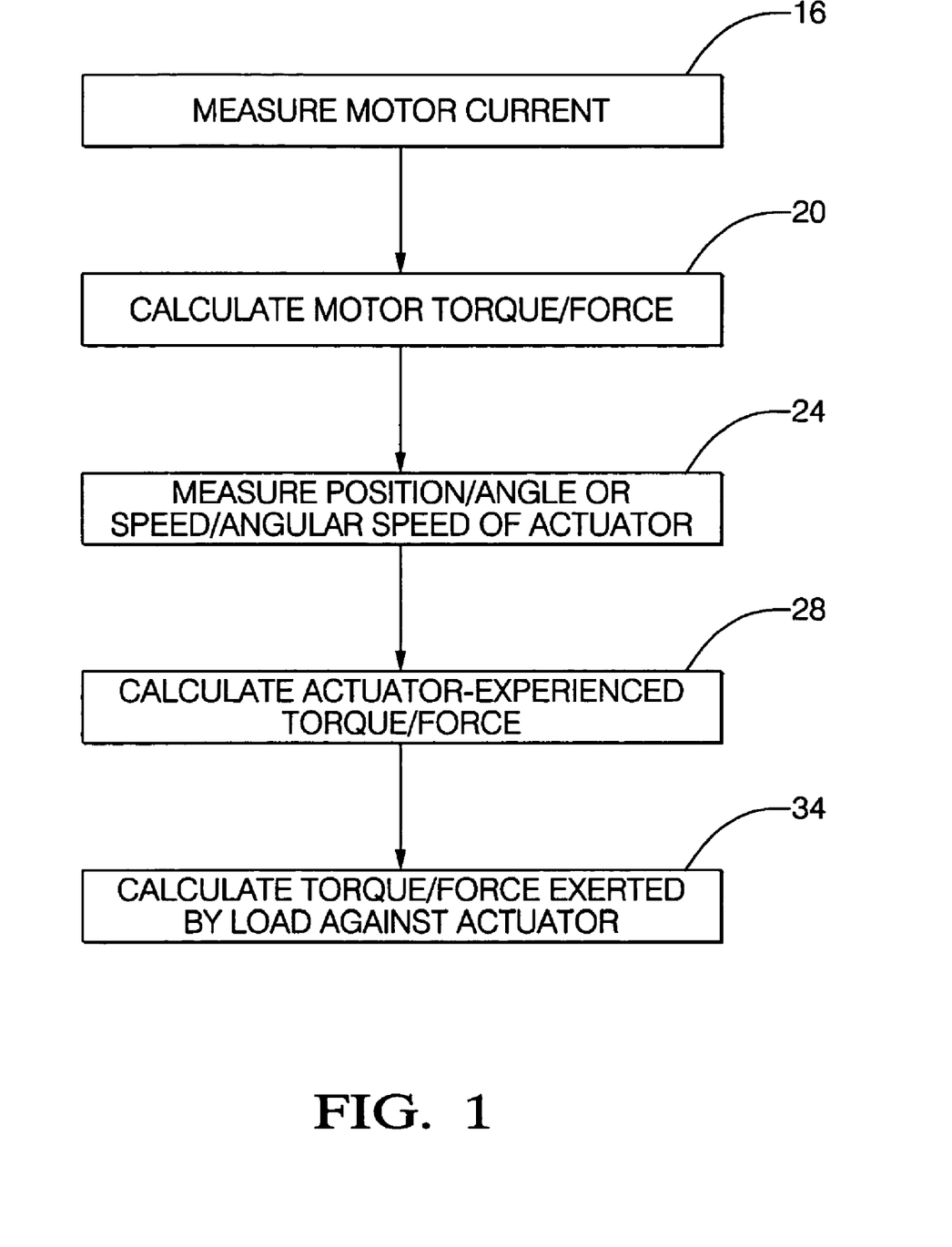
FIG. 1 is a flow chart of a first method of the invention.
Figure 2:
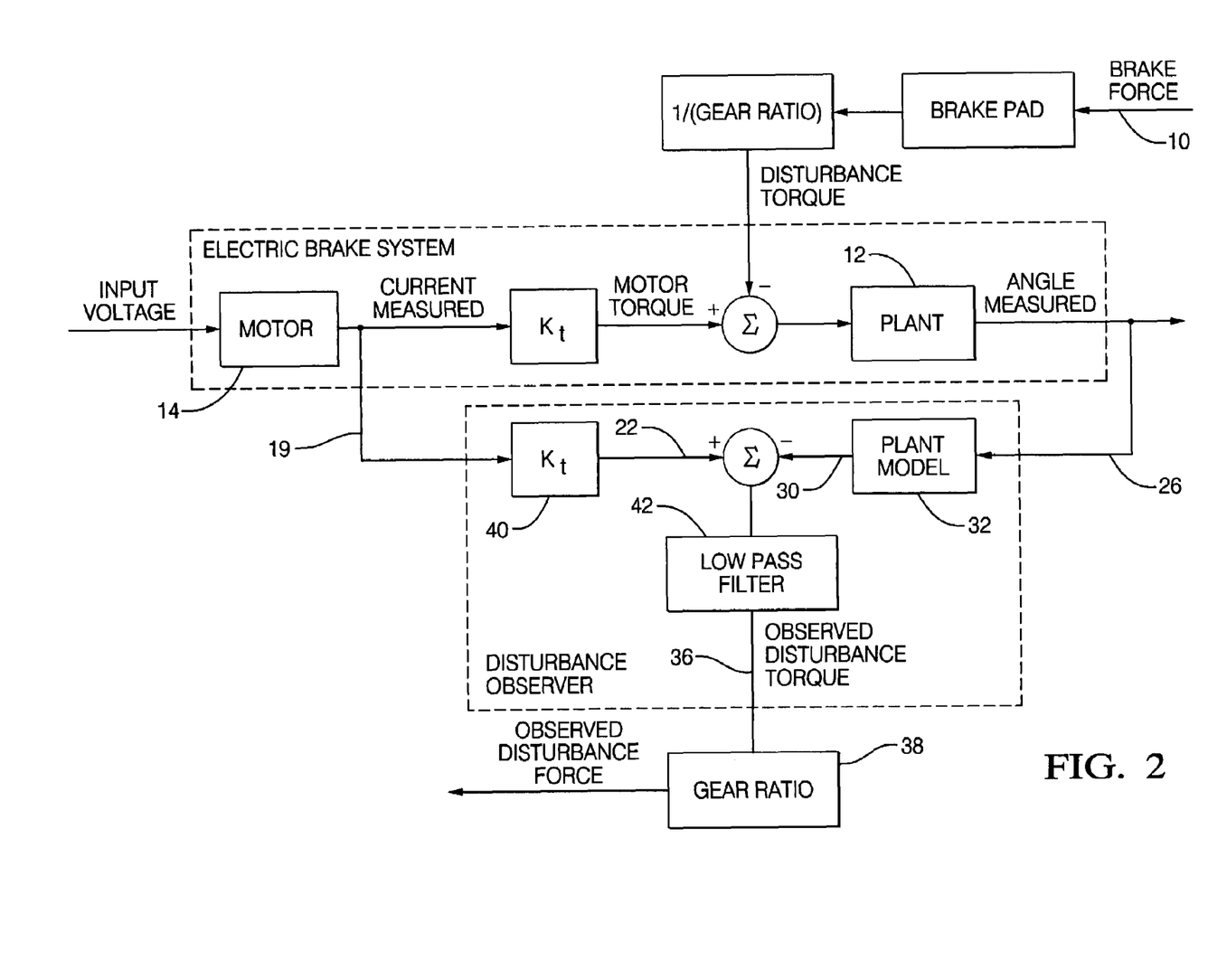
FIG. 2 is a schematic block diagram of an example of the method of FIG. 1 applied to an embodiment of an automotive electromechanical brake caliper.

Referring now to the drawings, FIG. 1 illustrates a first method of the present invention and FIG. 2 illustrates a schematic block diagram of a non-limiting example of the method of FIG. 1 applied to an embodiment of an automotive electromechanical brake caliper. The first method is for estimating a torque/force exerted by a load 10 against an actuator 12 driven by an electric motor 14 against the load 10. The first method includes steps a) through e). Step a) is labeled as "Measure Motor Current" in block 16 of FIG. 1. Step a) includes measuring motor current 19 of the electric motor 14. Step b) is labeled as "Calculate Motor Torque/Force" in block 20 of FIG. 1. Step b) includes calculating a motor torque/force 22 of the electric motor 14 from the measured motor current 19. Step c) is labeled as "Measure Position/Angle or Speed/Angular Speed Of Actuator" in block 24 of FIG. 1. Step c) includes measuring a position/angle or speed/angular speed 26 of the actuator 12 when the actuator 12 is driven by the electric motor 14 to engage the load 10. Step d) is labeled as "Calculate Actuator-Experienced Torque/Force" in block 28 of FIG. 1. Step d) includes calculating an actuator-experienced torque/force 30 due to the electric motor 14 and the load 10 from the measured position/angle or the measured speed/angular speed 26 using a mathematical model 32 of the actuator 12. Step e) is labeled as "Calculate Torque/Force Exerted By Load Against Actuator" in block 34 of FIG. 1.

Step e) includes calculating the torque/force 36 exerted by the load 10 against the actuator 12 using at least a difference between the calculated motor torque/force 22 and the calculated actuator-experienced torque/force 30.

It is noted that the actuator-experienced torque/force is the dynamic result of the torque/force experienced by the actuator due to the electric motor and the torque/force experienced by the actuator due to the load.

In one example of the first method, step e) calculates the torque/force 36 exerted by the load 10 against the actuator 12 as equal to the difference.

It is noted that measuring a speed/angular speed includes calculating a first time derivative of a measured position/angle. The term "torque/force" means torque or force or torque and force. The term "position/angle" means position or angle, and the term "speed/angular speed" means speed or angular speed. Creating a mathematical model 32 suitable for use in step d) of the first method is within the ordinary ability of those skilled in the art. In one example, the electric motor 14 used in step a) of the first method is a rotary motor. In a different example, the electric motor used in step a) is a linear motor.

In a first application, the actuator 12 used in step c) of the first method moves rotatably into engagement with the load. In one variation of the first application, step c) measures the angle moved by the actuator 12. In this variation, the mathematical model implicitly operates on angular speed of the actuator. In a different variation of the first application, step c) measures the angular speed of the actuator. In one modification, the first method calculates the torque exerted by the load 10 against the actuator 12. In one extension the first method calculates the force exerted by the load 10 against the actuator 12 by using the calculated torque exerted by the load against the actuator and a mathematical conversion 38 from torque to force.

In a second application, the actuator used in step c) of the first method moves linearly into engagement with the load. In one variation of the second application, step c) measures the position of the actuator. In this variation, the mathematical model implicitly operates on speed of the actuator. In a different variation of the second application, step c) measures the speed of the actuator. In one modification, the first method calculates the force exerted by the load against the actuator.

In a first enablement of the first method, the actuator 12 is an electromechanical actuator driven by the electric motor 14, and the mathematical model 32 of the actuator 12 is a mathematical model of the mechanical aspects of the electromechanical actuator. In one variation, the electromechanical actuator is an electromechanical brake caliper. In one modification, the electromechanical brake caliper is an automotive electromechanical brake caliper. In a second enablement of the first method, the actuator is an electrohydraulic actuator. Other enablements are left to the artisan.

In one employment of the first method, step b) calculates the motor torque/force 22 of the electric motor 14 by multiplying the measured motor current 19 times a current-to-torque/force conversion factor 40.

In one utilization of the first method, step e) uses a mathematical filter 42 to pass lower frequencies of the difference and to block higher frequencies of the difference, and step e) calculates the torque/force 36 exerted by the load 10 against the actuator 12 using at least the mathematically-filtered difference.

Such mathematical filtering filters out high frequency mathematical "noise" as can be appreciated by the artisan.

FIG. 2 illustrates an example of the method of FIG. 1 applied to an embodiment of an automotive electromechanical brake caliper (labeled "Electric Brake System"). In FIG. 2, the block labeled "Plant" represents the actuator (electromechanical brake caliper) which is driven by the block labeled "Motor" and which is subject to a load (the arrow labeled "Brake Force"). In this example, $K_t$ is a current-to-torque conversion factor. The effect of the load is a "Disturbance Torque" calculated as an "Observed Disturbance Torque" by a mathematical construct labeled "Disturbance Observer". The box labeled "Gear Ratio" (which can be a part of the Disturbance Observer) is a static or dynamic mathematical conversion yielding the force exerted by the load against the actuator as indicated by the arrow labeled "Observed Disturbance Force". In one application, the "Observed Disturbance Force" is used by a controller (not shown) to compute the "Input Voltage" to the electric motor to control the brake (via the actuator) as is within the ordinary level of skill of the artisan.

One example of an equation for the box labeled "Plant Model" in FIG. 2 which receives the Angle Measured (measured angle) input is:

$$\frac{Js^2 + ds + 1e - 10}{1e - 7s^2 + 1e - 7s + 1}.$$

It is noted that one example of an equation for the box labeled "Plant Model" in a figure similar to FIG. 2 but with Angular Speed Measured (instead of Angle Measured) from the Plant is:

$$\frac{Js + d}{1e - 7s + 1}.$$

In one illustration, the measured angular speed is obtained by differentiating a measured angle. In these equations: J=total inertia at the electric motor; d=motor viscous damping; s=Laplace operator; "1e-10" is an engineering notation meaning $10^{-10}$, and "1 e-7" is an engineering notation meaning $10^{-7}$. One example of an equation for the box labeled "Low Pass Filter" in FIG. 2 is $$\frac{0.6s + 1}{0.01s^2 + 0.6s + 1}$$

which will have a −20 dB/decade roll over and substantially a 10 Hz cut off frequency.

Figure 3:
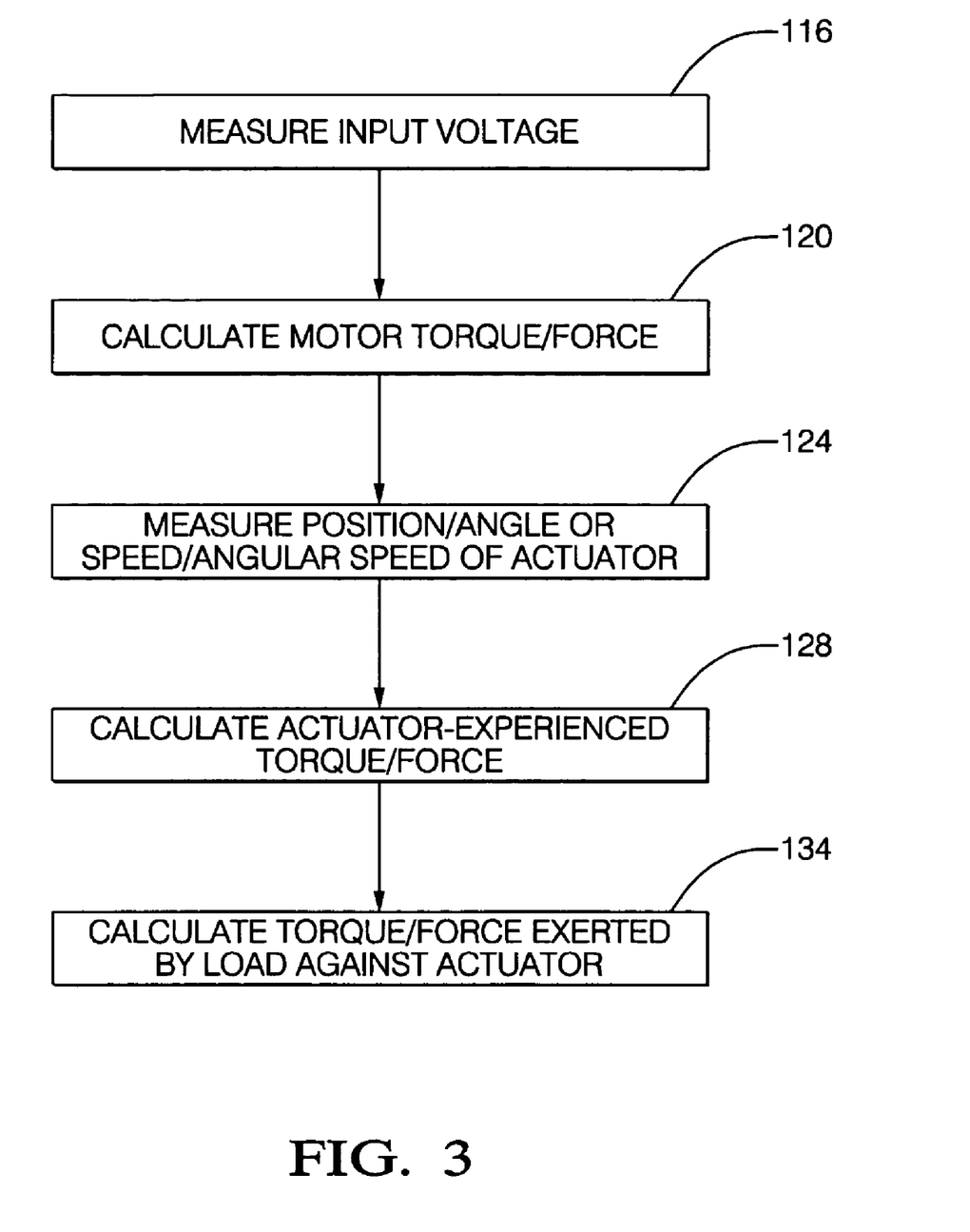
FIG. 3 is a flow chart of a second method of the invention.
Figure 4:
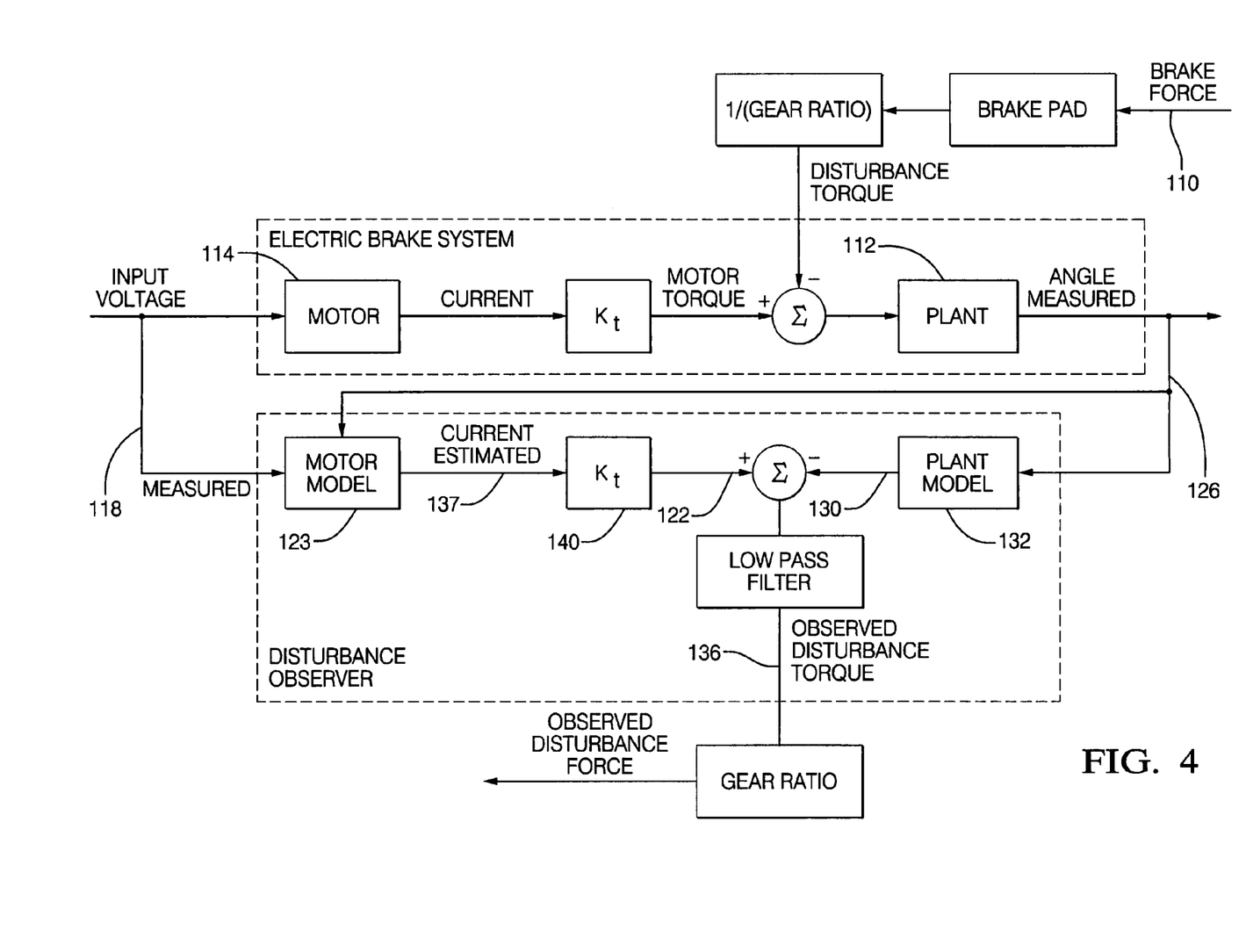
FIG. 4 is a schematic block diagram of an example of the method of FIG. 3 applied to an embodiment of an automotive electromechanical brake caliper.

Referring again to the drawings, FIG. 3 illustrates a second method of the present invention and FIG. 4 illustrates a schematic block diagram of a non-limiting example of the method of FIG. 3 applied to an embodiment of an automotive electromechanical brake caliper. The second method is for estimating a torque/force exerted by a load 110 against an actuator 112 driven by an electric motor 114 against the load 110. The second method includes steps a) through e). Step a) is labeled as "Measure Input Voltage" in block 116 of FIG. 3. Step a) includes measuring input voltage 118 of the electric motor 114. Step b) is labeled as "Calculate Motor Torque/force" in block 120 of FIG. 3. Step b) includes calculating a motor torque/force 122 of the electric motor 114 using at least the measured input voltage 118 and a mathematical model 123 of the electric motor 114. Step c) is labeled as "Measure Position/Angle or Speed/Angular Speed Of Actuator" in block 124 of FIG. 3. Step c) includes measuring a position/angle or speed/angular speed 126 of the actuator 112 when the actuator 112 is driven by the electric motor 114 to engage the load 110. Step d) is labeled as "Calculate Actuator-Experienced Torque/Force" in block 128 of FIG. 3. Step d) includes calculating an actuator-experienced torque/force 130 due to the electric motor 114 and the load 110 from the measured position/angle or the measured speed/angular speed 126 using a mathematical model 132 of the actuator 112. Step e) is labeled as "Calculate Torque/Force Exerted By Load Against Actuator" in block 134 of FIG. 3. Step e) includes calculating the torque/force 136 exerted by the load 110 against the actuator 112 using at least a difference between the calculated motor torque/force 122 and the calculated actuator-experienced torque/force 130.

In one example of the second method, step e) calculates the torque/force 136 exerted by the load 110 against the actuator 112 as equal to the difference.

Creating a mathematical model 123 suitable for use in step b) of the first method is within the ordinary ability of those skilled in the art. In one example of the third method, step b) calculates (estimates) a motor current 137 from the measured input voltage 118, the measured position/angle or speed/angular speed 126, and the mathematical model 123 of the electric motor 114, and step b) then calculates the motor torque/force 122 of the electric motor 114 by multiplying the calculated motor current 137 times a current-to-torque conversion factor 140.

FIG. 4 illustrates an example of the method of FIG. 3 applied to an embodiment of an automotive electromechanical brake caliper (labeled "Electric Brake System"). It is noted that, apart from steps a) and b), the enablements, variations, etc. of the first method are equally applicable to the second method.

In one implementation, examples of equations for the boxes labeled "Plant Model" and "Low Pass Filter" in FIG. 4 are the same as the examples of the equations for the boxes labeled "Plant Model" and "Low Pass Filter" in FIG. 2. An example of an equation for the box labeled "Motor Model" in FIG. 4 is:

$$\frac{dI}{dt} = \frac{1}{L}[V_s - RI - K_e \omega].$$

In this equation: I=estimated (calculated) motor current; t=time; L=motor inductance; $V_s$=supply voltage (measured input voltage); R=motor resistance; $K_e$=back emf constant (ratio of volt to speed in rad/s); and $\omega$=angular speed (which is obtained by differentiating the measured angle in FIG. 4).

Figure 5:
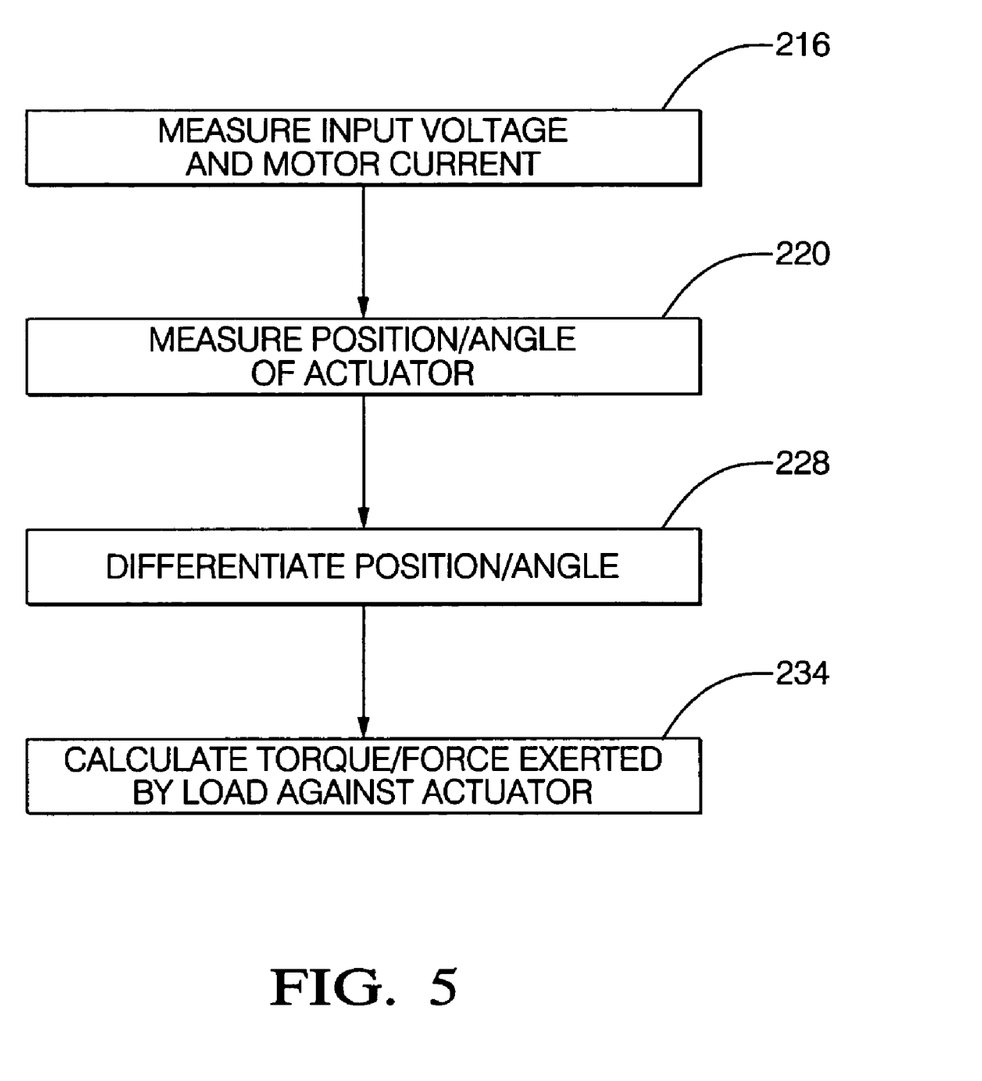
FIG. 5 is a flow chart of a third method of the invention.
Figure 6:
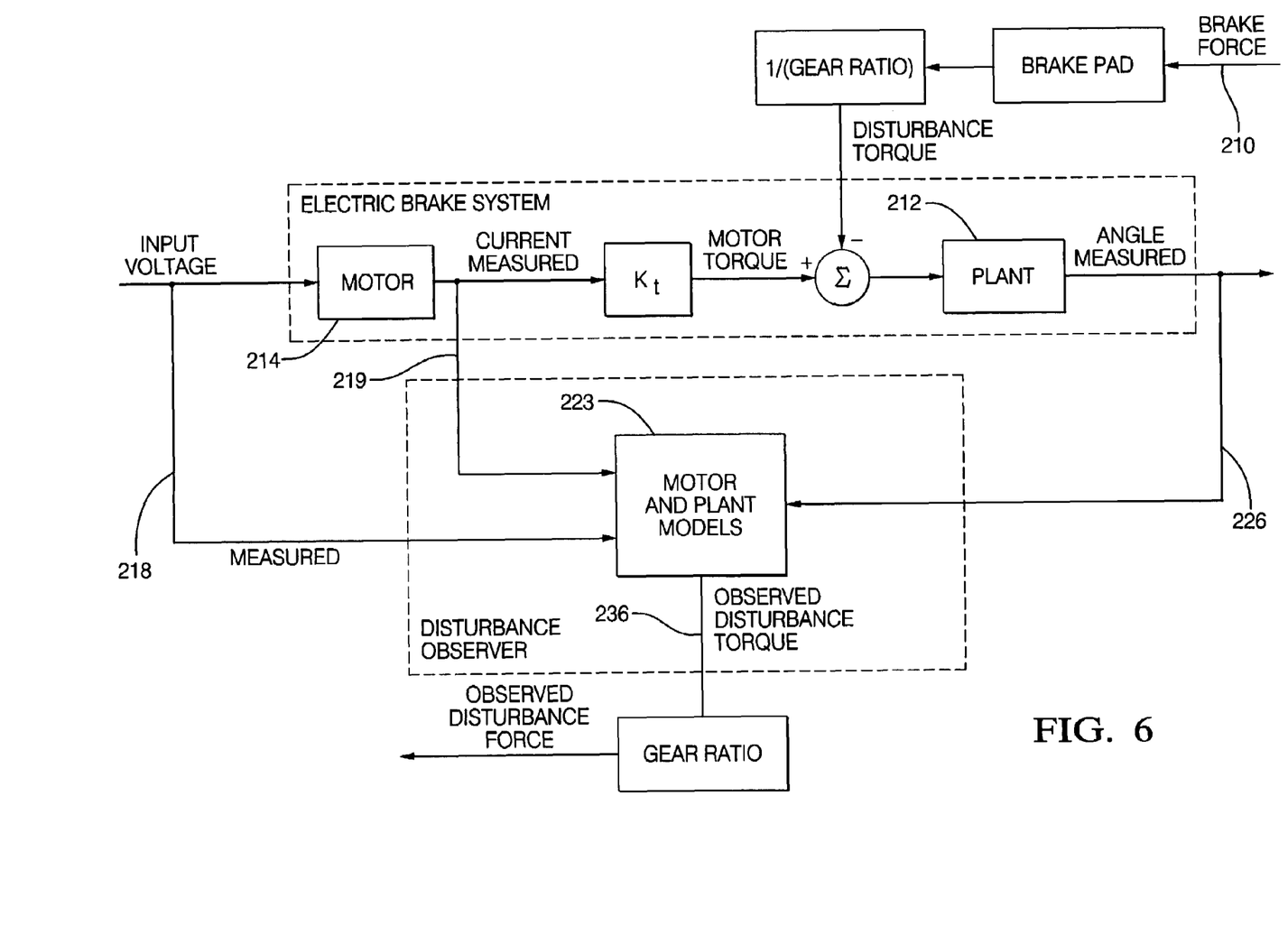
FIG. 6 is a schematic block diagram of an example of the method of FIG. 5 applied to an embodiment of an automotive electromechanical brake caliper.

Referring again to the drawings, FIG. 5 illustrates a third method of the present invention and FIG. 6 illustrates a schematic block diagram of a non-limiting example of the method of FIG. 5 applied to an embodiment of an automotive electromechanical brake caliper. The third method is for estimating a torque/force exerted by a load 210 against an actuator 212 driven by an electric motor 214 against the load 210. The third method includes steps a) through d). Step a) is labeled as "Measure Input Voltage And Motor Current" in block 216 of FIG. 5. Step a) includes measuring input voltage 218 and motor current 219 of the electric motor 214. Step b) is labeled as "Measure Position/Angle Of Actuator" in block 220 of FIG. 5. Step b) includes measuring a position/angle 226 of the actuator 212 when the actuator 212 is driven by the electric motor 214 to engage the load 210. Step c) is labeled as "Differentiate Position/Angle" in block 228 of FIG. 5. Step c) includes calculating first and second time derivatives of the measured position/angle 226. Step d) is labeled as "Calculate Torque/Force Exerted By Load Against Actuator" in block 234 of FIG. 5. Step d) includes calculating the torque/force 236 exerted by the load 210 against the actuator 212 using at least the measured input voltage 218 and motor current 219, the measured position/angle 226, the calculated first and second time derivatives, and mathematical models 233 of the electric motor 214 and the actuator 212.

It is noted that, for the purpose of describing the third method, calculating first and second time derivatives of a measured position/angle 226 is equivalent to measuring a speed/angular speed and measuring an acceleration/angular acceleration. Creating mathematical models 233 suitable for use in step d) of the third method is within the ordinary ability of those skilled in the art.

In a first enablement of the third method, the actuator 212 is an electromechanical actuator driven by the electric motor 214, and the description of the actuator of the mathematical models 233 is a mathematical description of the mechanical aspects of the electromechanical actuator. In one variation, the electromechanical actuator is an electromechanical brake caliper. In one modification, the electromechanical brake caliper is an automotive electromechanical brake caliper.

FIG. 6 illustrates an example of the method of FIG. 5 applied to an embodiment of an automotive electromechanical brake caliper (labeled "Electric Brake System"). In FIG. 6, the block labeled "Plant" represents the actuator (electromechanical brake caliper) which is driven by the block labeled "Motor" and which is subject to a load (the arrow labeled "Brake Force"). In this example, $K_t$ is a current-to-torque conversion factor. The effect of the load is a "Disturbance Torque" calculated as an "Observed Disturbance Torque" by a mathematical construct labeled "Disturbance Observer". The box labeled "Gear Ratio" (which can be a part of the Disturbance Observer) is a static or dynamic mathematical conversion yielding the force exerted by the load against the actuator and is indicated by the arrow labeled "Observed Disturbance Force". In one application, the "Observed Disturbance Force" is used by a controller (not shown) to compute the "Input Voltage" to the electric motor to control the brake (via the actuator) as is within the level of skill of the artisan.

An example of the "Motor And Plant Models" of FIG. 6 is given by the following two equations:

$$\frac{d\hat{I}}{dt} = \frac{V_s}{L} - \frac{R}{L}\hat{I} - \frac{K_e}{L}\omega + K(I - \hat{I}) \text{ and } \hat{T}_l = K_t\hat{I} - J\frac{d\omega}{dt} - c\omega.$$

In these equations: the carrot above the character indicates calculated (estimated); $\hat{T}_l$=calculated load torque (Observed Disturbance Torque); $\hat{I}$=calculated motor current; I=measured motor current; K=current observer gain; J=total inertia of the electric motor; c=motor damping coefficient; and $\omega$=angular speed (which is obtained by differentiating the measured angle in FIG. 6). Therefore, the major difference between the examples of FIG. (6) and FIG. (4) is in essence the correction term in the motor model (first equation in this paragraph), which multiplies the current observation error by a gain "K" to force the current estimate to zero. It is noted that the second equation in this paragraph is the plant model.

Several benefits and advantages are derived from one or more of the methods of the invention. In one example, torque/force sensors are not used, wherein such torque/force sensors are expensive, have hysteresis, and are too sensitive to ambient temperature variation in thermally fluctuating environments such as those found in automotive electromechanical brake calipers. In the same or a different example, determining a point of contact of the actuator with the load (i.e., detecting the zero) is not done, wherein such zero detection adds to system complexity. Applicants have performed successful computer simulations of examples of the first, second and third methods.

The foregoing description of several methods of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

The invention claimed is:

1. A method for estimating a torque/force exerted by a load against an actuator driven by an electric motor against the load, wherein the method comprises the steps of:
    a) measuring motor current of the electric motor;
    b) calculating a motor torque/force of the electric motor from the measured motor current;
    c) measuring a position/angle or speed/angular speed of the actuator when the actuator is driven by the electric motor to engage the load;
    d) calculating an actuator-experienced torque/force due to the electric motor and the load from the measured position/angle or the measured speed/angular speed using a mathematical model of the actuator without calculating a difference between the measured position/angle or the measured speed/angular speed and an estimated position/angle or estimated speed/angular speed of the actuator derived from using at least the calculated actuator-experienced torque/force; and
    e) calculating the torque/force exerted by the load against the actuator using at least a difference between the calculated motor torque/force and the calculated actuator-experienced torque/force.

2. The method of claim 1, wherein the actuator is an electromechanical actuator driven by the electric motor, and wherein the mathematical model of the actuator is a mathematical model of the mechanical aspects of the electromechanical actuator.

3. The method of claim 2, wherein the electromechanical actuator is an electromechanical brake caliper.

4. The method of claim 3, wherein the electromechanical brake caliper is an automotive electromechanical brake caliper.

5. The method of claim 1, wherein step b) calculates the motor torque/force of the electric motor by multiplying the measured motor current times a current-to-torque/force conversion factor.

6. The method of claim 1, wherein step e) uses a mathematical filter to pass lower frequencies of the difference and to block higher frequencies of the difference, and wherein step e) calculates the torque/force exerted by the load against the actuator using at least the mathematically-filtered difference.

7. A method for estimating a torque/force exerted by a load against an actuator driven by an electric motor against the load, wherein the method comprises the steps of:
    a) measuring input voltage of the electric motor;
    b) calculating a motor torque/force of the electric motor using at least the measured input voltage and a mathematical model of the electric motor;
    c) measuring a position/angle or speed/angular speed of the actuator when the actuator is driven by the electric motor to engage the load;
    d) calculating an actuator-experienced torque/force due to the electric motor and the load from the measured position/angle or the measured speed/angular speed using a mathematical model of the actuator without calculating a difference between the measured position/angle or the measured speed/angular speed and an estimated position/angle or estimated speed/angular speed of the actuator derived from using at least the calculated actuator-experienced torque/force; and
    e) calculating the torque/force exerted by the load against the actuator using at least a difference between the calculated motor torque/force and the calculated actuator-experienced torque/force.

8. The method of claim 7, wherein the actuator is an electromechanical actuator driven by the electric motor, and wherein the mathematical model of the actuator is a mathematical model of the mechanical aspects of the electromechanical actuator.

9. The method of claim 8, wherein the electromechanical actuator is an electromechanical brake caliper.

10. The method of claim 9, wherein the electromechanical brake caliper is an automotive electromechanical brake caliper.

11. The method of claim 7, wherein step b) calculates a motor current from the measured input voltage, the measured position/angle or speed/angular speed, and the mathematical model of the electric motor, and wherein step b) calculates the motor torque/force of the electric motor by multiplying the calculated motor current times a current-to-torque conversion factor.

12. The method of claim 7, wherein step e) uses a mathematical filter to pass lower frequencies of the difference and to block higher frequencies of the difference, and wherein step e) calculates the torque/force exerted by the load against the actuator using at least the mathematically-filtered difference.

13. A method for estimating a torque/force exerted by a load against an actuator driven by an electric motor against the load, wherein the method comprises the steps of:
    a) measuring input voltage and motor current of the electric motor;
    b) measuring a position/angle of the actuator when the actuator is driven by the electric motor to engage the load
    c) calculating first and second time derivatives of the position/angle; and
    d) calculating the torque/force exerted by the load against the actuator using at leasst the measured input voltage and electric current, the measured position/angle, the calculated first and second time derivatives, and mathematical models of the electric motor and the actuator without calculating a difference between the measured position/angle and an estimated position/angle of the actuator derived from using at least the calculated actuator-experienced torque/force.

14. The method of claim 13 wherein the actuator is an electromechanical actuator driven by the electric motor, and wherein an actuator portion of the mathematical model of the electric motor and the actuator is a mathematical model of the mechanical aspects of the electromechanical actuator.

15. The method of claim 14, wherein the electromechanical actuator is an electromechanical brake caliper.

16. The method of claim 15, wherein the electromechanical brake caliper is an automotive electromechanical brake caliper.

* * * * *